Patented Dec. 6, 1927.

1,651,617

UNITED STATES PATENT OFFICE.

OTTO MOSER, OF MAINZ-MOMBACH, GERMANY, ASSIGNOR TO VEREIN FUR CHEMISCHE INDUSTRIE AKTIENGESELLSCHAFT, OF FRANKFORT-ON-THE-MAIN, GERMANY, A CORPORATION.

EXTRACTING OF GUAIACOL.

No Drawing. Application filed December 28, 1926, Serial No. 157,605, and in Germany July 17, 1925.

My invention relates to the manufacture of pure crystalline guaiacol from wood-tar or fractions thereof which are rich in phenols.

In the art of producing guaiacol or the monomethylether of the ortho-dioxybenzol having the formula

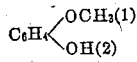

$$C_6H_4\diagup \begin{matrix}OCH_3(1)\\OH(2)\end{matrix}$$

from wood-tar oils as hitherto practised it is very difficult to separate the guaiacol from the other constituents of the parent material and complicated operations have to be performed for the purpose. Usually first alkali-earth salts are formed and such salts are decomposed by means of suitable acids whereupon it is possible to separate out the monomethylethers of the divalent phenols, that is guaiacol and creosol, from the phenols and, this done, to separate the guaiacol from the cresol by way of fractional distillation and rectification in order to obtain the guaiacol in crystalline form. Notwithstanding this time-consuming and complicated process the guaiacol thus recovered from the parent substance is not absolutely pure and, therefore, objectionable the more so, since the impurities reduce the melting point of the product down to about 26° C. and render the product hygroscopic or cause the same to absorb water from the atmosphere so as to liquefy.

The object of my invention is to produce guaiacol from tar oils and the like in a more simple and efficient manner with a view to obtain the same in a practically pure crystalline condition and endowed with a melting point of 31° C. so that it will retain its crystalline form even when kept in stock for a considerable length of time.

With this object in view my invention consists in an improved process or method which will be hereinafter more fully described in the following specification and pointed out in the appended claims.

I have discovered that by adding a comparatively small quantity of alkali to tar oils a selective effect will result from the action of the alkali inasmuch as the latter first binds or combines with the monomethylethers of the divalent phenols whilst the other phenols remain unaltered. My invention is based and depends upon this discovery. The said monomethylethers of the divalent phenols amount to 20 to 25 per cent, on rough average, of the totality of phenols present in the tar oil. The alkali may be employed in the form of a 5 to 14% solution just depending upon the nature of the wood-tar oil, a higher concentration being advisable in case of a higher percentage of phenols in the oil.

The phenolates resulting from the treatment of the wood-tar oil with the alkali are separated in a known manner from the neutral oils and subsequently the resulting phenolates are treated with a suitable acid, such as preferably carbonic acid, for the purpose of decomposing the same in order to allow of separating the phenols. By way of fractional distillation the guaiacol is thereupon separated from the cresol and the guaiacol thus produced is allowed to crystallize in the cold.

Guaiacol made in the manner above described is absolutely pure and identical with synthetic guaiacol. The melting point thereof is about 31° C. In case of mixing the same with synthetic guaiacol a reduction of the melting point cannot be found to occur.

*Example 1.*—1000 ccm. of wood-tar oil (1.0537 specific gravity) which as regards its general character, is capable of distilling over at a temperature between 190° and 250° C. and which contains about 12 per cent of neutral oils and about 5 per cent of guaiacol, are mixed with 740 ccm. of a solution of caustic soda (1.116 specific gravity) for the purpose of extracting the phenols from the oil. The mixture is allowed to separate into two layers, the upper one being neutral oil and the lower one a solution of the phenolates formed. The latter then is drawn off and freed from any traces of neutral oil contained therein by evaporation. The phenolate solution thus obtained is treated with carbonic acid which will act to decompose the phenolate and set the phenols free which subsequently are subjected to a distilling operation in order to remove all of the water therefrom. The resulting product is a liquid of oily appearance and of a specific gravity of 1.105. By subjecting the same to fractional distillation at reduced pressure 50 ccm. of liquid guaiacol (1.125 specific gravity at 15° C.) are obtained which upon cooling will yield 32 gr. of crystallized guaiacol of a melting point of 31°.

*Example 2.*—7500 ccm. of wood-tar after having been freed from acid and heated to a temperature of about 50° C., are mixed with 3000 ccm. of a solution of caustic alkali as caustic soda of 8° Bé. likewise heated to a temperature of 50° C. The mixture is vigourously shaken or otherwise agitated for an hour or so. The phenolate solution is then separated from the residual tar and liberated from any neutral oil still adhering thereto, by boiling. Subsequently the phenols are separated by means of carbonic acid and freed from water by a following distilling operation. The yield amounts to 38 ccm. of an oily liquor of yellow-brown colour and of a specific gravity of 1.102 at 15° C. consisting of cresol and guaiacol. The described operations are repeated several times in order to collect a larger quantity of the oily product for the subsequent further treatment which is the same as described in Example 1.

The exact amount of caustic alkali required in connection with a certain particular sort of wood-tar may be determined by a preliminary test so as to be in accordance with the particular character or constitution of the tar.

It will be evident that my invention, while still being adhered to in its main essentials, may be varied and adapted in many ways according to the requirements desired or most suitable under different circumstances, without thereby departing from the nature and principle of my invention.

What I claim is:—

1. The method of separating guaiacol from a parent substance containing guaiacol and other phenols, which comprises adding to said substance a quantity of caustic alkali sufficient to bind or combine only with the monomethyl ethers of the divalent phenols present in said substance, separating off the lower level of the resulting product containing the phenolates, acidifying the latter, separating the free phenols, and finally rectifying the resulting liquid.

2. The method of separating guaiacol from a parent substance containing guaiacol and other phenols, which comprises adding to said substance a quantity of a solution of caustic alkali sufficient to bind or combine only with the monomethyl ethers of the divalent phenols present in said substance, separating off the lower level of the resulting product containing the phenolates, acidifying the latter, separating the free phenols, and finally rectifying the resulting liquid.

In testimony that I claim the foregoing as my invention, I have signed my name this 14th day of December, 1926.

OTTO MOSER.